Figure 1:
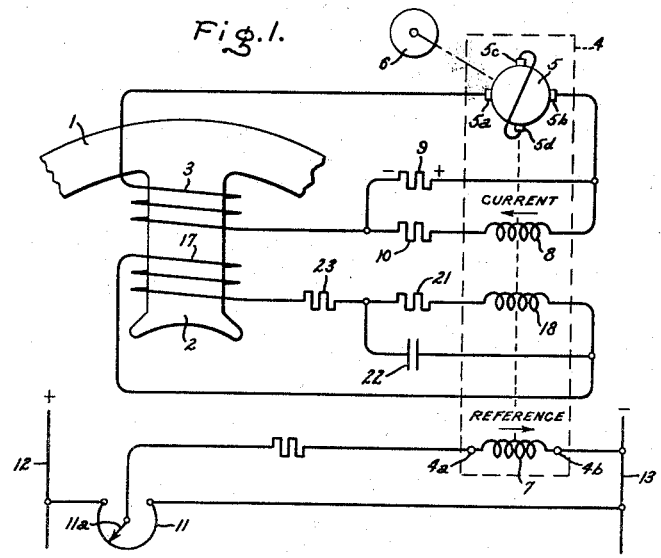

March 29, 1960     B. P. CHAUSSE     2,930,960
FIELD CURRENT REGULATING SYSTEM
Filed Dec. 23, 1957     2 Sheets-Sheet 1

Inventor:
B. Paul Chausse,
by Irving H. Marshman
His Attorney.

March 29, 1960

B. P. CHAUSSE 2,930,960

FIELD CURRENT REGULATING SYSTEM

Filed Dec. 23, 1957

2 Sheets-Sheet 2

Inventor:
B. Paul Chausse,
by Irving H. Marshman
His Attorney.

United States Patent Office 2,930,960
Patented Mar. 29, 1960

2,930,960

FIELD CURRENT REGULATING SYSTEM

Burnette Paul Chausse, Roanoke, Va., assignor to General Electric Company, a corporation of New York Application December 23, 1957, Serial No. 704,700

5 Claims. (Cl. 318—350)

This invention relates to electrical regulating systems, more particularly to systems in which an operating characteristic of a dynamoelectric machine is to be controlled by regulating the field excitation current to vary the magnetic flux in a magnetic path of the machine, and it has for an object the provision of a simple, reliable, efficient and inexpensive system of this character. By way of example and not by way of limitation, the absorption of a dynamometer and the speeds of hot strip mills, tandem cold mills and blooming mills are commonly controlled by field current regulators. In numerous applications of systems of this character and especially in those in which automatic control are involved, it is desirable for the purpose of effecting stable operation or for some other reason, that changes in the reference quantity of the field excitation current regulator shall be closely followed by corresponding changes in the magnetic flux in the magnetic structure of the machine.

However, magnetic flux and operating characteristics such as motor speed which depend upon flux do not transiently closely follow changes in field current on account of eddy currents in the magnetic path, and consequently they do not closely follow changes in the reference quantity of the regulator. The delay becomes quite serious in large machines, and accordingly a further and more specific object of this invention is to control a field current regulator to cause the magnetic flux in the magnetic structure of the controlled machine to follow without significant time delay changes in the current reference quantity. A corollary object in the case of a motor controlled by a field current regulator is to cause changes in the motor speed to follow substantially without time delay changes in the current reference quantity of the regulator.

Another specific object of the invention is to eliminate instability, i.e. hunting in the operation of automatic control systems in which a current regulator is utilized to control a dynamoelectric machine to maintain an operating characteristic such as gauge or tension of a strip of metal essentially constant at a predetermined value.

In carrying the invention into effect in one form thereof, a regulator for the field current of a dynamoelectric machine is provided with an input for receiving an adjustable current reference input quantity. Electrical connections are provided for deriving from the field circuit of the controlled dynamoelectric machine a quantity representative of the field current. The current regulator responds to the difference of these two quantities for varying the field current in a sense to reduce the difference to a minimum. Time delays between changes in the field current reference quantity and corresponding changes in the magnetic flux in the magnetic structure of the machine are substantially eliminated by means for deriving from the field circuit and supplying to the regulator in aiding relation to any change in the reference quantity an additional control quantity related to the rate of change of magnetic flux in the field structure.

Figure 4:
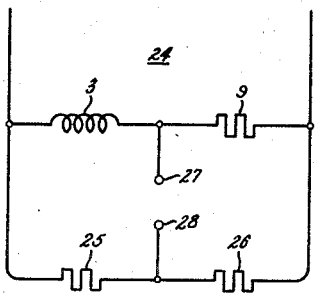
Figure 2:
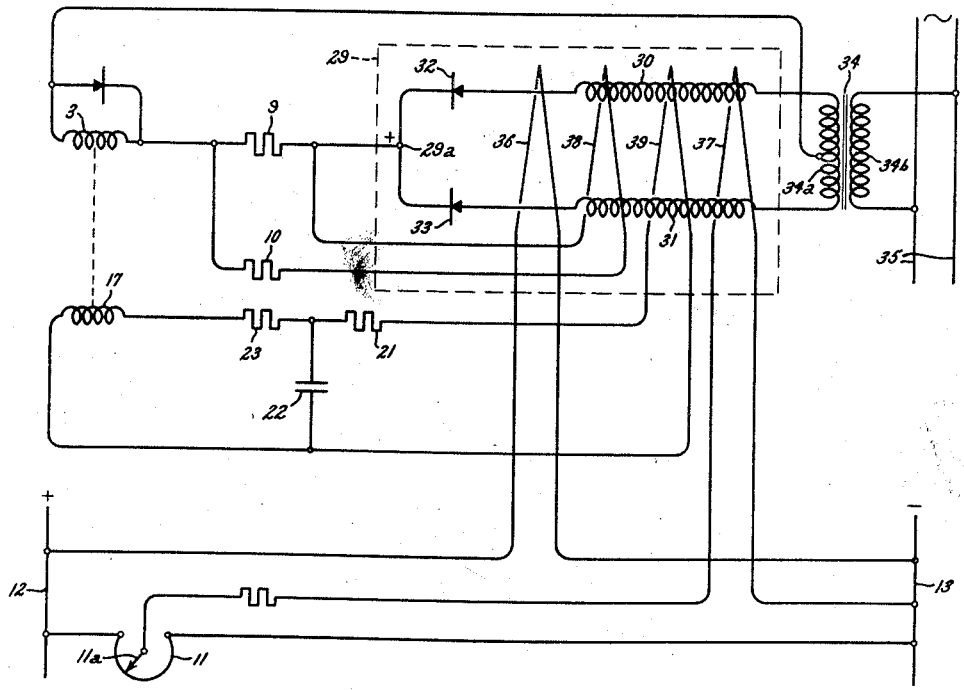
Figure 3:
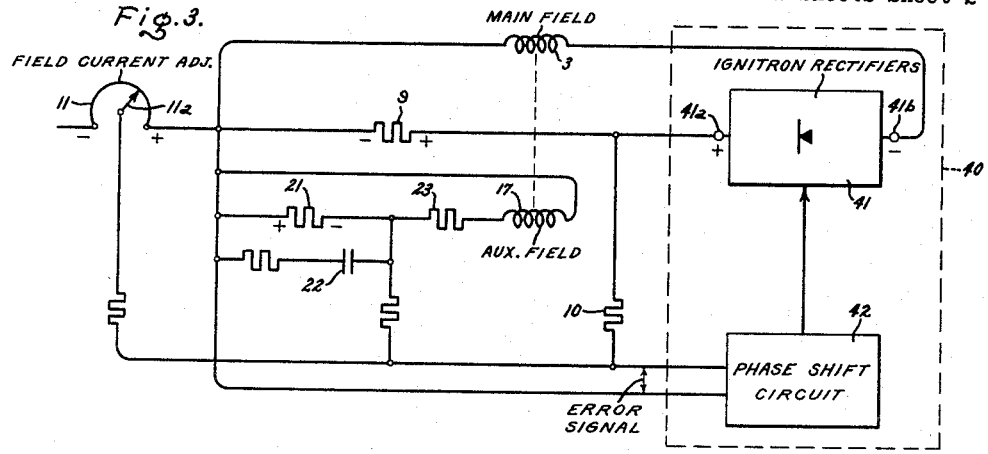
Figure 5:
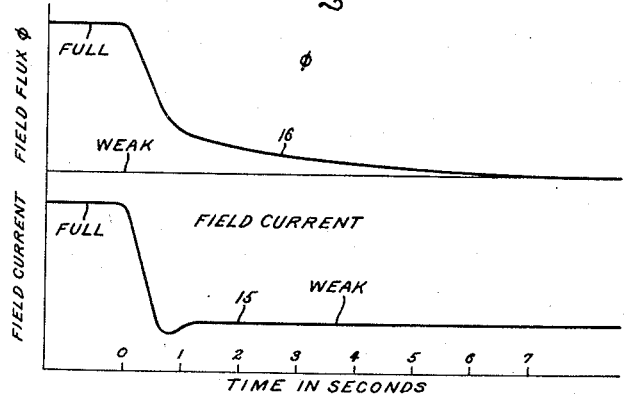
Figure 6:
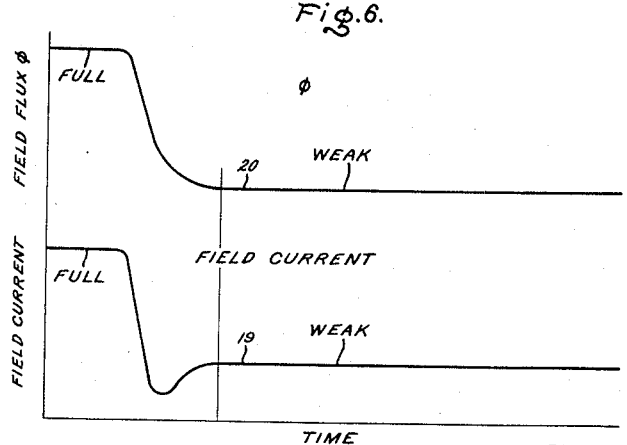

For a better and more complete understanding of the invention reference should now be had to the following specification and to the accompanying drawings of which Fig. 1 is a schematic diagram of an embodiment of the invention in one of its simplest forms; Figs. 2 and 3 are simple schematic diagrams of modifications of the invention; Fig. 4 is a simple schematic diagram of a modified form of an element of the invention, Figs. 5 and 6 are characteristic curves of electrical operating characteristics which serve to facilitate an understanding of the invention.

Referring now to the drawings and particularly to Fig. 1, the field structure 1 of a dynamoelectric machine which, for the purposes of illustration, may be assumed to be a D.-C. motor has one or more pairs of pole pieces, each similar to the illustrated pole piece 2. On these pole pieces is mounted a magnetic field winding comprising a plurality of individiual field coils each similar to the coil 3 on the pole 2.

For the purpose of controlling the current in the field winding circuit to control the motor speed, a suitable regulating means 4 is provided. This regulating means is provided with input terminals 4a and 4b. It operates to adjust the current in the field winding circuit to a value corresponding to the magnitude of a field current reference quantity which is supplied to such input terminals and thereafter to maintain the field current substantially constant at such adjusted value until the reference quantity is adjusted to a new value. Although the regulating means 4 may be of any suitable type, it is illustrated as a rotary exciter and amplifier 5 of the amplidyne type. Other types of amplifiers such as vacuum tube, transistor, magnetic amplifier, thyratron, ignitron or conventional rotary exciter or, in the case of a multi-stage amplifier, any combination of these various types would be quite appropriate. However, in the interest of simplicity, an amplifier of the amplidyne type is shown in Fig. 1. It serves both as a source of excitation for the field winding circuit for the controlled dynamoelectric machine and as a regulating amplifier.

The amplidyne 5 is a dynamoelectric machine having a stator member and a rotor member which is driven by suitable driving means such as an induction motor 6 at a speed which is preferably substantially constant. On its rotor member is an armature winding (not shown) which is connected to the commutator. A pair of load circuit brushes 5a and 5b are mounted on an axis of the machine known as the load circuit axis. On an axis displaced ninety electrical degrees therefrom and therefore known as the quadrature axis are mounted a pair of short circuited brushes 5c and 5d. The stator member is provided with a reference field winding 7 and an oppositely poled control field winding 8. Among the advantageous properties of the amplidyne are an extremely high amplification factor and an extremely high speed of response. Its speed of response is so great that for the purposes of its use as a current regulator, the delay between a change in the input quantity and the corresponding change in the output quantity, i.e. load circuit voltage is so small that it may be disregarded. The field circuit, i.e. the field winding coils 3 of the controlled machine are connected to the load circuit brushes 5a and 5b of the amplidyne.

Suitable means are provided for deriving from the field circuit of the controlled machine a control quantity which is representative of the field current. These means are illustrated as a voltage dropping resistor 9 in the field circuit and electrical connections from the terminals of the resistor 9 to the terminals of the field winding 8 with a resistor 10 included in such connections. Excitation is supplied to the reference field winding 7 from a suitable source such as is represented by the adjustable rheostat 11 which is connected across the constant direct current supply terminals 12 and 13. As shown, the reference field winding 7 is connected between the slider 11a of the rheostat and the negative supply terminal 13.

Briefly the operation of the amplidyne regulating means as thus far described is as follows: With the rheostat slider 11a in the zero voltage position, zero voltage is applied to and zero current flows in the reference field winding circuit. Under this condition the output voltage at the load circuit terminals 5a and 5b, the current in the field circuit of the motor, the voltage drop across the resistor 9 and the current in the opposing control field winding 8 of the amplidyne are all zero. Movement of the slider 11a to a point on the rheostat of increased voltage causes a corresponding voltage and current to be supplied to the reference field winding 7. Since the opposing field winding 8 is not energized until current flows in the load circuit, the excitation produced by the reference field winding is initially unopposed. Owing to the low inductance and low resistance of the circuit of the short-circuited brushes 5c and 5d, a relatively small increase in flux produced by the reference winding 7 produces a relatively large and an extremely rapid increase in the output voltage at the load brushes. This rapid increase of the output voltage produces a vigorous forcing action which causes the current supplied to the motor field to increase at a high rate. However, as this current increases, a voltage drop appears across resistor 9 which causes current to be supplied to opposing field winding 8. As a result, the net excitation of the machine decreases until a balanced condition exists in which the net excitation is just sufficient to sustain current in the motor field circuit 3 at a value corresponding to the value of the current in the reference field winding and corresponding also to the position of the slider 11a.

There are many applications of a dynamoelectric machine in which it is highly desirable that changes in the magnetic flux of its field structure shall closely follow changes in the reference quantity. For example in the case of automatic control of the speed of a motor by a field current regulator in response to changes in a field current reference quantity, it is highly desirable that changes in the magnetic flux (or speed) of the motor shall closely follow changes in the reference quantity of the regulator. Field current regulators such as the regulator 4 of Fig. 1 will cause changes in the reference quantity to be closely followed by changes in the output quantity, i.e. the field current. However, this does not solve the problem, because magnetic flux (or speed in the case of a motor) does not transiently follow closely the change in field current owing to time delays produced by eddy currents in the magnetic path as a result of the changing flux. In the case of large machines this delay may become quite serious. For example, in large steel mill motors in the rating range of 4,000–8,000 horsepower, the delay between changes in the field current and corresponding changes in the field flux and the motor speed may be in the range of 5–10 seconds which is highly undesirable. This delay is illustrated in Fig. 5 in which ordinates represent values of the reference quantity, the motor field current and motor field flux (or speed) and abscissae represent time. For a step change of the reference quantity with respect to time, the relationship between the motor field current and time produced by a conventional prior art current regulator is represented by curve 15, and the relationship between motor field flux (or speed) and time is represented by the curve 16.

In the case represented by curves 15 and 16 of a conventional field current regulator operating to weaken the field current, the motor field flux had barely attained its steady state weakened value at the end of seven seconds, although the field current attained its new steady state constant value at the end of one second. Thus, it is seen that prior art regulators operate quickly to change the field current to a new value corresponding to a new value of the reference quantity. However, that component of the regulator output current which instantaneously produces magnetic flux in the field and hence the flux itself will only build up or build down with the eddy current time constant $T_e$ of the magnetic path. The eddy current time constant may be obtained from the manufacturer of the machine, and it may also be obtained by tests known to those skilled in the art.

For the purposes of eliminating the time delay between changes in the reference input quantity to the regulator and corresponding changes in the magnetic flux of the motor field, feedback means are provided for supplying a corrective quantity to the regulator. These feedback means are illustrated as comprising an auxiliary winding 17 on one of the field poles of the motor and an auxiliary control field winding 18 on the magnetic field structure of the amplidyne.

During the change in the field flux of the motor a voltage is induced in the auxiliary winding 17. This feedback voltage is supplied to the auxiliary winding 18 of the amplidyne through resistors 21 and 23 (omit capacitor 22 for the moment). This winding is poled to aid any change made in the reference field winding 7 and thus provides a positive feedback signal. The choice of resistors 21 and 23 and the turns in winding 18 results in a multiplying factor $K_1$ for the auxiliary field voltage which has units of ampere turns per volt.

If the eddy current effect, $T_e$, is assumed to be a simple time constant it may be demonstrated mathematically that with a selection of $K_1$ of the correct magnitude the troublesome eddy current time constant cancels out of the system equations. All remaining time constants are effectively within the regulator and thus may be minimized by straightforward regulator design.

The value of $K_1$ at which the eddy current time constant vanishes is (1) $$K_1 = \frac{K_2 T_e}{LN}$$

where
L is the inductance of the field winding
N is the effective turns ratio between the auxiliary and main motor field winding
$T_e$ is the eddy current time constant, and
$K_2$ is the regulator feedback term in units of ampere turns per ampere of field current.

The physical explanation of the operation of this positive feedback to eliminate the eddy current time constant between the reference input of the regulator and the motor field flux is that as the reference is changed to cause the regulator to call for a corresponding change in the motor field current, the corrective feedback becomes effective and calls for an even greater change. This greater change causes the field current to overshoot very considerably its final value and thus vigorously to force a change in the motor field flux so that it attains its final value in a minimum time. With the correct magnitude of $K_1$ as defined by Equation 1, the feedback signal from the auxiliary winding dies out just as the motor field flux and motor field current attain their correct final values. This is graphically illustrated in Fig. 6 for the same change in reference quantity as was used in the case of the conventional regulator represented in Fig. 5. In Fig. 6 curve 19 represents the relationship between field current and time and curve 20 represents the relationship between motor field flux and time produced by a field current regulator provided with the positive rate of change of flux feedback of the invention. Thus the effect of the previously uncontrollable eddy current time constant is effectively counteracted so that the speed of response of changes of motor field flux to changes in the reference input quantity is made nearly independent of such time constant. A beneficial secondary effect is that the stability of the regulator system is greatly improved.

In the magnetic field structure of an actual dynamoelectric machine there are an infinite number of eddy current paths with differing time constants. Also, there is usually a large leakage flux, and saturation effects are present to some degree. It has been determined that these adverse factors may be counteracted by feeding the corrective positive feedback signal through a time constant network which at first delays slightly the application of the corrective quantity but later maintains its effect longer. For this purpose a resistor 21 is included in circuit with the auxiliary field winding 18 of the amplidyne, and a capacitor 22 is connected in parallel with the combination of resistor 23 and field winding 18.

*Bridge network*

The corrective voltage supplied to the feedback control winding 18 may also be derived from the motor field circuit by the network means illustrated in Fig. 4. This network is a simple bridge 24 of which the motor field winding 3 and the resistor 9 constitute the two arms of one of the two parallel paths, and the resistors 25 and 26 constitute the other two arms. The resistors 25 and 26 are selected so that the ratio of resistor 25 to resistor 26 is the same as the ratio of the resistance of field winding 3 to resistor 9.

The output terminals 27 and 28 of the bridge are connected to the auxiliary input winding 18 of the regulator. Under steady state conditions, i.e. unchanging current in the motor field winding, the bridge is balanced and zero voltage is supplied from the bridge to winding 18. However, when the regulator responds to a change in its reference quantity to effect a corresponding change in the field current, a voltage is induced in the motor field winding 3. Since the RI voltage drop of the field winding is compensated by the RI voltage drop across resistor 25, the voltage appearing across the output terminals 27 and 28 is only the induced voltage and can be supplied to the feedback winding 18 instead of supplying voltage from an auxiliary winding.

In the modification which is illustrated in Fig. 2 a magnetic amplifier type current regulating means 29 replaces the amplidyne type regulating means of Fig. 1. Otherwise the modification of Fig. 2 is substantially the same as the system of Fig. 1, and corresponding elements in both figures have the same reference characters. The magnetic amplifier 29 is of the type generally known in the art as self-saturating. It comprises a magnetic core member (not shown) on corresponding legs of which are mounted main reactance windings 30 and 31 respectively. Connected in series with these reactance windings 30 and 31 are two half-wave rectifiers 32 and 33 respectively. These rectifiers and reactance windings are connected in a full wave or diametric rectifier configuration which is supplied from a suitable source of alternating voltage such as the center-tapped secondary winding 34a of a transformer 34 of which the primary winding 34b is supplied from a source which is represented by the supply conductors 35. The motor field winding 3 is connected in series with resistor 9 in the output circuit of the amplifier between the positive output terminals 29a and the center tap of a secondary winding 34a. Preferably a "free wheeling" rectifier is connected in parallel with the field winding. Any other suitable self-saturating type of magnetic amplifier may be used.

For the purpose of controlling the saturation of the core and thus controlling its output current, the amplifier is provided with a plurality of control windings 36, 37, 38 and 39. The winding 36 is a negative bias winding for biasing the amplifier to cutoff. The control windings 37, 38 and 39 correspond to the current reference winding 7, the field current responsive winding 8 and the eddy current time delay corrective feedback control winding 18 respectively of Fig. 1 and are connected in a similar manner. In particular, control winding 38 is poled to oppose, and control winding 39 is poled to aid changes in the current in reference winding 37. The operation is so similar to the operation of the system of Fig. 1 as not to require additional description.

In the modification which is illustrated in Fig. 3 an ignitron amplifier type current regulating means so replaces the amplidyne type regulating means of Fig. 1. In other respects the modification of Fig. 3 is substantially the same as the system of Fig. 1 and corresponding elements in both figures have the same reference characters.

The amplifier 40 comprises a full wave rectifier 41 and a phase-shifting firing circuit 42. Both the rectifier and the phase-shift circuit are well known and are therefore conventionally illustrated. The motor field winding 3 is connected in series with resistor 9 in the output circuit of the rectifier between its positive output terminal 41a and its negative terminal 41b.

For the purpose of controlling the phase-shift circuit the reference quantity source 11 and the resistor 9 in the field current circuit are connected in a comparison circuit which is connected to the input of the phase-shift network 42. As a result of these connections an error signal which is proportional to the difference of the reference quantity and a quantity representative of the field current is supplied to the phase shift network. The operation is so generally similar to the operation of the system of Fig. 1 as not to require further description.

Although in accordance with the provisions of the patent statutes, this invention is described as embodied in concrete apparatus, and the principle of the invention has been described together with the best mode in which it is now contemplated applying that principle, it will be understood that the invention is not limited to the apparatus shown and described since alterations and modifications will readily occur to persons skilled in the art without departing from the true spirit of the invention.

What I claim as new and desire to secure by Letters Patent of the United States is:

1. A regulating system for a dynamoelectric machine provided with a magnetic field structure and a field winding mounted thereon comprising input terminals for receiving an adjustable field current reference quantity, circuit connections for deriving from the field winding circuit a control quantity representative of the field current, regulating means responsive to the difference of said quantities for varying said field current in a sense to reduce said difference, and means for minimizing the time delay produced by eddy currents in said field structure between a change in said reference quantity and the resulting change in magnetic flux in said magnetic structure comprising means for deriving from said field circuit and supplying to said regulating means in a direction to aid a change in said reference quantity a control quantity proportional to the rate of change of flux in said field structure.

2. A regulating system for a dynamoelectric machine having a magnetic field structure comprising input terminals for receiving an adjustable reference voltage, electrical connections for deriving from said magnetic field circuit a voltage representative of the field current, regulating means connected to be responsive to the difference of said reference and derived voltages for varying said field current in a sense to reduce said difference, and means for minimizing the time delay resulting from eddy currents in said field structure between a change in said reference voltage and the resulting change in the magnetic flux of said circuit comprising means for deriving from said field circuit a rate voltage representative of the rate of change of flux in said structure and connected to supply said rate voltage to said regulating means in aiding relation to a change in said reference voltage.

3. A regulating system for a dynamoelectric machine having a magnetic field member and a field winding mounted thereon comprising input terminals for receiving an adjustable reference voltage, connections for deriving from the field winding circuit a voltage representative of the field circuit current, regulating means connected to be responsive to the difference of said reference and derived voltages for varying said field current to reduce said difference in voltages, and means for minimizing the time delay resulting from eddy currents in said member between a change in said reference voltage and the resulting change in the magnetic flux in said field member comprising an auxiliary winding mounted on said field member in inductive relationship with said field winding for deriving a rate voltage representative of the rate of change of flux in said magnetic member and connected to supply said rate voltage to said regulating means in aiding relationship to a change in said reference voltage.

4. A regulating system for a dynamoelectric machine having a magnetic field member and a field winding mounted thereon comprising input terminals for receiving an adjustable reference voltage, connections for deriving from the field winding circuit a voltage representative of the field circuit current, regulating means connected to be responsive to the difference of said reference and derived voltages for varying said field current to reduce said difference in voltages, an amplifier provided with an input control winding connected to said input terminals to be supplied with said reference voltage, an opposing control winding connected to said field circuit connections to be supplied with said derived voltage, a third control winding poled to aid said input control winding and an output connected to said field winding, and means for minimizing the time delay produced by eddy currents in said field member between a change in said reference voltage and the resulting change in the magnetic flux in said magnetic structure comprising means for deriving from said field circuit and supplying to said third control winding a voltage representative of the rate of change of flux in said field member.

5. A regulating system for a dynamoelectric machine provided with a magnetic field structure and a field winding mounted thereon comprising input terminals for receiving an adjustable field current reference quantity, circuit connections for deriving from the field winding circuit a control quantity representative of the field current, regulating means responsive to the difference of said quantities for varying said field current in a sense to reduce said difference, and means for minimizing the time delay between a change in said reference quantity and the resulting change in magnetic flux in said magnetic structure comprising network means for deriving from said field winding circuit and supplying to said regulating means in aiding relationship to a change in said reference quantity a control quantity representative of the rate of change of current in said field winding comprising a bridge having said field winding as one of its arms and connections from the output of said bridge to an input of said regulating means.

References Cited in the file of this patent
UNITED STATES PATENTS

| | | |
|---|---|---|
| 1,100,895 | Lijenroth | June 23, 1914 |
| 1,708,747 | Whiting | Apr. 9, 1929 |
| 1,913,952 | Powell | June 13, 1933 |
| 1,988,288 | Wilkinson | Jan. 15, 1935 |
| 2,677,097 | Carleton | Apr. 27, 1954 |
| 2,804,589 | Penn | Aug. 25, 1957 |

FOREIGN PATENTS

| | | |
|---|---|---|
| 653,444 | Great Britain | May 16, 1951 |